(12) United States Patent
Frankel et al.

(10) Patent No.: US 7,996,223 B2
(45) Date of Patent: Aug. 9, 2011

(54) SYSTEM AND METHOD FOR POST PROCESSING SPEECH RECOGNITION OUTPUT

(75) Inventors: Alan Frankel, Framingham, MA (US); Ana Santisteban, Somerville, MA (US)

(73) Assignee: Dictaphone Corporation, Stratford, CT (US)

(*) Notice: Subject to any disclaimer, the term of this patent is extended or adjusted under 35 U.S.C. 154(b) by 914 days.

(21) Appl. No.: 10/953,474

(22) Filed: Sep. 29, 2004

(65) Prior Publication Data
US 2005/0108010 A1 May 19, 2005

Related U.S. Application Data

(60) Provisional application No. 60/507,135, filed on Oct. 1, 2003.

(51) Int. Cl.
*G10L 15/04* (2006.01)
(52) U.S. Cl. ......... 704/252; 704/231; 704/246; 704/251
(58) Field of Classification Search .................. None
See application file for complete search history.

(56) References Cited

U.S. PATENT DOCUMENTS

| | | | |
|---|---|---|---|
| 4,477,698 A | 10/1984 | Szlam et al. | |
| 4,965,763 A | 10/1990 | Zamora | |
| 5,253,164 A | 10/1993 | Holloway et al. | |
| 5,325,293 A | 6/1994 | Dorne | |
| 5,327,341 A | 7/1994 | Whalen et al. | |
| 5,392,209 A | 2/1995 | Eason et al. | |
| 5,544,360 A | 8/1996 | Lewak et al. | 707/1 |
| 5,664,109 A | 9/1997 | Johnson et al. | |
| 5,799,268 A | 8/1998 | Boguraev | |
| 5,809,476 A | 9/1998 | Ryan | |
| 5,832,450 A | 11/1998 | Myers et al. | 705/3 |
| 5,903,858 A * | 5/1999 | Saraki | 704/4 |
| 5,970,463 A | 10/1999 | Cave et al. | |
| 5,995,918 A * | 11/1999 | Kendall et al. | 704/1 |
| 6,014,663 A | 1/2000 | Rivette et al. | |
| 6,021,202 A | 2/2000 | Anderson et al. | |
| 6,052,693 A | 4/2000 | Smith et al. | |
| 6,055,494 A | 4/2000 | Friedman | |
| 6,088,437 A | 7/2000 | Amick | |
| 6,094,635 A * | 7/2000 | Scholz et al. | 704/270 |
| 6,182,029 B1 | 1/2001 | Friedman | |
| 6,192,112 B1 | 2/2001 | Rapaport et al. | |
| 6,292,771 B1 | 9/2001 | Haug et al. | |
| 6,347,329 B1 | 2/2002 | Evans | |

(Continued)

OTHER PUBLICATIONS

F. Song et al., A Graphical Interface to a Semantic Medical Information System, *Journal of Foundations of Computing and Decision Sciences*, 22(2), 1997.

(Continued)

*Primary Examiner* — Leonard Saint Cyr
(74) *Attorney, Agent, or Firm* — Wolf, Greenfield & Sacks, P.C.

(57) ABSTRACT

A system and method may be disclosed for facilitating the conversion of dictation into usable and formatted documents by providing a method of post processing speech recognition output. In particular, the post processing system may be configured to implement rewrite rules and process raw speech recognition output or other raw data according to those rewrite rules. The application of the rewrite rules may format and/or normalize the raw speech recognition output into formatted or finalized documents and reports. The system may thereby reduce or eliminate the need for post processing by transcriptionists or dictation authors.

11 Claims, 3 Drawing Sheets

U.S. PATENT DOCUMENTS

| | | | |
|---|---|---|---|
| 6,374,226 B1 * | 4/2002 | Hunt et al. | 704/275 |
| 6,405,165 B1 | 6/2002 | Blum et al. | |
| 6,434,547 B1 | 8/2002 | Mishelevich et al. | |
| 6,438,533 B1 | 8/2002 | Spackman et al. | |
| 6,490,549 B1 * | 12/2002 | Ulicny et al. | 704/10 |
| 6,553,385 B2 | 4/2003 | Johnson et al. | 707/104.1 |
| 6,915,254 B1 | 7/2005 | Heinze et al. | 704/9 |
| 6,947,936 B1 | 9/2005 | Suermondt et al. | 707/7 |
| 6,963,832 B2 * | 11/2005 | Vanhilst | 704/9 |
| 7,124,144 B2 | 10/2006 | Christianson et al. | 707/102 |
| 2002/0007285 A1 | 1/2002 | Rappaport | 705/2 |
| 2002/0095313 A1 | 7/2002 | Haq | 705/2 |
| 2002/0143824 A1 | 10/2002 | Lee et al. | 707/523 |
| 2002/0169764 A1 | 11/2002 | Kincaid et al. | 707/3 |
| 2003/0014253 A1 * | 1/2003 | Walsh | 704/260 |
| 2003/0046264 A1 | 3/2003 | Kauffman | 707/1 |
| 2003/0061201 A1 | 3/2003 | Grefenstette et al. | 707/3 |
| 2003/0115080 A1 | 6/2003 | Kasravi et al. | 705/1 |
| 2003/0208382 A1 | 11/2003 | Westfall | 705/3 |
| 2003/0233345 A1 | 12/2003 | Perisic et al. | 707/3 |
| 2004/0103075 A1 | 5/2004 | Kim et al. | 707/1 |
| 2004/0139400 A1 | 7/2004 | Allam et al. | 715/526 |
| 2004/0186746 A1 | 9/2004 | Angst et al. | 705/3 |
| 2004/0220895 A1 | 11/2004 | Carus et al. | |
| 2004/0243545 A1 | 12/2004 | Boone et al. | |
| 2004/0243551 A1 | 12/2004 | Boone et al. | |
| 2004/0243552 A1 | 12/2004 | Titemore et al. | |
| 2004/0243614 A1 | 12/2004 | Boone et al. | |
| 2005/0114122 A1 | 5/2005 | Uhrbach et al. | |
| 2005/0120020 A1 | 6/2005 | Carus et al. | |
| 2005/0120300 A1 | 6/2005 | Schwager et al. | |
| 2005/0144184 A1 | 6/2005 | Carus et al. | |

OTHER PUBLICATIONS

F. Song et al., A Cognitive Model for the Implementation of Medical Problem Lists, *Proceedings of the First Congress on Computational Medicine, Public Health and Biotechnology*, Austin, Texas, 1994.
F. Song et al., A Graphical Interface to a Semantic Medical Information System, *Karp-95 Proceedings of the Second International Symposium on Knowledge Acquisition*, Representation and Processing, pp. 107-109, 1995.
*Epic Web Training Manual*, pp. 1-33, 2002.
B. Hieb, Research Note, NLP Basics for Healthcare, Aug. 16, 2002.
C. Shalizi et al., Pattern Discovery in Time Series, Part I: Theory, Algorithm, Analysis, and Convergence, *Journal of Machine Leaning Research* ? (2002) ?-? Submitted Oct. 28, 2002; Published ?/2002.
C. Nevill-Manning et al., The Development of Holte's 1R Classifier, Department of Computer Science.
D. Cutting et al., A Practical Part-of-Speech Tagger, Xerox Palo Alto Research Center.
J. Zavrel et al., Recent Advances in Memory-Based Part-of-Speech Tagging, ILK/Computational Linguistics.
E. Brill, Some Advances in Transformation-Based Part of Speech Tagging, Spoken Language Systems Group.
J. Nivre, DAC723: Language Technology Finite State Morphology, Vaxjo University of Mathematics and Systems Engineering, p. 1/11.
M. Creutz, Morphology and Finite-State Transducers, Oct. 31, 2001, Chap 3, Jurafsky & Martin.
http://www.comp.lancs.ac.uk/computing/research/stemming/general/index.htm printed Jul. 19, 2004.
http://www.comp.lancs.ac.uk/computing/research/stemming/general/stemmingerrors.htm printed Jul. 19, 2004.
http://www.comp.lancs.ac.uk/computing/research/stemming/general/performance.htm printed Jul. 19, 2004.
M. Lee et al., Cleansing Data for Mining and Warehousing, Lecture Notes in Computer Science vol. 1677 archive, *Proceedings of the 10th International Conference on Database and Expert Systems Applications*, pp. 751-760, Springer-Verlag, London, 1999.
C. Van Rijsbergen, *Information Retrieval*, 2nd Ed., Ch. 5, Butterworths, London, 1979.
J. Day, Extracting Knowledge from Text Using Learning by Constraint Relaxation (LCR), CSI, www.csi-inc.com/CSI/pdf/jday_icim02.pdf.
W. Gale et al., Discrimination Decisions for 100,000-Dimensional Spaces, *Current Issues in Computational Linguistics*, pp. 429-450, Kluwer Academic Publishers, 1994.
W. Daelemans et al., TiMBL: Tilburg Memory Based Learner, version 5.0, Reference Guide, ILK *Research Group Technical Report Series No. 04-02 (ILK-0402)*, ILK Research Group, Tilburg University, Tilburg, Netherlands, 2004.
Case Study: Massachusetts Medical Society http://www.microsoft.com/resources/casestudies/CaseStudy.asp?CaseStudyID=14931 posted Jan. 13, 2004.
W. Braithwaite, Continuity of Care Record (CCR) http://www.hl7.org/library/himss/2004Orlando/ContinuityofCareRecord.pdf.
C. Waegemann, EHR vs. CCR: What is the difference between the electronic health record and the continuity of care record?, Medical Records Institute, 2004.
Press Release: Kryptiq Announces Support of CCR Initiative and Introduces New Solutions that Enable Information Portability, Accessibility and Clinical System Interoperability, http://www.kryptig.com/News/PressReleases/27.html Posted Feb. 17, 2004.
Work Item Summary: WK4363 Standard Specification for the Continuity of Care Record (CCR), http://www.astm.org/cgi-bin/SoftCart.exe/DATABASE.CART/WORKITEMS/WK4363.htm?E+mystore Mar. 3, 2004.
Continuity of Care Record (CCR): The Concept Paper of the CCR, v. 2.1b, http://www.bhtinfo.com/CCR.Concept%20Paper.1.5.doc.
Continuity of Care Record, American Academy of Family Physicians, http://www.aafp.org/x24962.xml?printxml posted Nov. 12, 2003.
Continuity of Care Record (CCR), AAFP Center for Health Information Technology, http://www.centerforhit.org/x201.xml posted Aug. 20, 2004.
Core Measures web page, Joint Commission on Accreditation of Healthcare Organizations, http://www.jcaho.org/pms/core+measures/ printed Mar. 22, 2004.
*Specifications Manual for National Implementation of Hospital Core Measures*, v. 2.0, Joint Commission on Accreditation of Healthcare Organizations, http://www.jcaho.org/core+measures/information+on+final+specifications.htm.
Code Information and Education web page, American Medical Association http://www.ama-assn.org/ama/pub/category/3884.html printed Mar. 22, 2004.
Category III CPT Codes, American Medical Association http://www.ama-assn.org/ama/pub/article/3885-4897.html printed Mar. 22, 2004.
ICD-9-CM Preface (FY04) http://ftp.cdc.gov/pub/Health_Statistics/NCHS/Publications/ICD9-CM/2004/Prefac05.RTF.
*ICD-9-CM Official Guidelines For Coding and Reporting*, effective Oct. 1, 2003.
Q. X. Yang et al., "Faster algorithm of string comparison," *Pattern Analysis and Applications*, vol. 6, No. 1, Apr. 2003: pp. 122-133.
U.S. Appl. No. 11/068,493, Carus, et al.
U.S. Appl. No. 10/953,471, Cote, et al.
U.S. Appl. No. 11/069,203, Cote, et al.
U.S. Appl. No. 11/007,626, Cote, et al.
U.S. Appl. No. 10/840,428, Carus, et al.
U.S. Appl. No. 10/951,281, Cote, et al.
"Hardware Reference Manual," Release 3 for DOS, revised Jan. 1994, PIKA Technologies, Inc., Ontario, Canada, available at http://www.pikatechnologies.com/downloads/legacy/AVA%20B-Series%20Hardware%20Manual.pdf (last accessed Jul. 25, 2005).
"Customizing D/41 Call Analysis," date unknown, Intel Corp., Santa Clara, California, available at http://resource.intel.com/telecom/support/appnotes/custd41d.htm (last accessed Jul. 25, 2005).

* cited by examiner

SYSTEM AND METHOD FOR POST PROCESSING SPEECH RECOGNITION OUTPUT

CROSS-REFERENCE TO RELATED APPLICATIONS

This application claims the benefit of priority of U.S. Provisional Application No. 60/507,135, entitled, "SYSTEM AND METHOD FOR POST PROCESSING SPEECH RECOGNITION OUTPUT", filed Oct. 1, 2003, which is hereby incorporated by reference in its entirety.

This application relates to co-pending U.S. patent application Ser. No. 10/447,290, entitled "SYSTEM AND METHODS UTILIZING NATURAL LANGUAGE PATIENT RECORDS," filed on May 29, 2003; U.S. patent application Ser. No. 10/413,405, entitled "SYSTEMS AND METHODS FOR CODING INFORMATION." filed Apr. 15, 2003; co-pending U.S. patent application Ser. No. 11/068,493, entitled "A SYSTEM AND METHOD FOR NORMALIZATION OF A STRING OF WORDS," filed on Feb. 28, 2005; co-pending U.S. patent application Ser. No. 10/448,320, entitled "METHOD, SYSTEM, AND APPARATUS FOR DATA REUSE," filed on May 30, 2003; co-pending U.S. patent application Ser. No. 10/787,889, entitled "SYSTEM, METHOD AND APPARATUS FOR PREDICTION USING MINIMAL AFFIX PATTERNS," filed on Feb. 27, 2004; co-pending U.S. patent application Ser. No. 10/448,317, entitled, "METHOD, SYSTEM, AND APPARATUS FOR VALIDATION", filed on May 30, 2003; co-pending U.S. patent application Ser. No. 10/448,325, entitled, "METHOD, SYSTEM, AND APPARATUS FOR VIEWING DATA", filed on May 30, 2003; co-pending U.S. patent application Ser. No. 10/948,625, entitled "METHOD, SYSTEM, AND APPARATUS FOR ASSEMBLY, TRANSPORT AND DISPLAY OF CLINICAL DATA", filed Sep. 23, 2004; co-pending U.S. patent application Ser. No. 10/951,291, entitled, "SYSTEM AND METHOD FOR CUSTOMIZING SPEECH RECOGNITION INPUT AND OUTPUT", filed Sep. 27, 2004; co-pending U.S. patent application Ser. No. 10/953,448, entitled "SYSTEM AND METHOD FOR DOCUMENT SECTION SEGMENTATIONS," filed on Sep. 30, 2004; co-pending U.S. patent application Ser. No. 10/953,471, entitled "SYSTEM AND METHOD FOR MODIFYING A LANGUAGE MODEL AND POST-PROCESSOR INFORMATION," filed on Sep. 29, 2004; co-pending U.S. patent application Ser. No. 10/951,281, entitled "METHOD, SYSTEM AND APPARATUS FOR REPAIRING AUDIO RECORDINGS," filed on Sep. 27, 2004; co-pending U.S. patent application Ser. No. 11/069,203, entitled "SYSTEM AND METHOD FOR GENERATING A PHASE PRONUNCIATION," filed on Feb. 28, 2005; co-pending U.S. patent application Ser. No. 11/007,626, entitled "SYSTEM AND METHOD FOR ACCENTED MODIFICATION OF A LANGUAGE MODEL," filed on Dec. 7, 2004; and co-pending U.S. patent application Ser. No. 10/840,428, entitled "CATEGORIZATION OF INFORMATION USING NATURAL LANGUAGE PROCESSING AND PREDEFINED TEMPLATES," filed on Sep. 23, 2004, all of which are hereby incorporated by reference in their entirety.

BACKGROUND OF THE INVENTION

Speech recognition systems have become important tools in certain work environments. In particular, environments with considerable amounts of dictation and transcription, as in the medical and legal professions, benefit from the speed and cost of speech recognition software. However, speech recognition outputs are often unformatted and unusable without some form of post processing. This is due in part to the fact that certain text normalizations that are part of the speech recognition process result in output that does not have the appearance of regular text as one expects to find in a document.

Speech recognition output may also be problematic because of the way in which people speak. Dictated speech is not always organized in the final desired order, and the manner in which people express themselves in speech does not necessarily correspond well to the manner in which they prefer to express themselves in print. Also, dictated speech may not be formatted as expected for text documents in a specific working environment, such as a hospital. In the medical field, medical reports are often generated through dictation, and speech recognition output from the dictation must be post-processed, then edited by a transcriptionist. The post-processing and editing are required to convert the speech recognition output into a properly formatted medical record for a specific site.

Previous tools attempted to post process speech recognition outputs using systems that were exclusively or primarily grammar-based. These grammar-based systems are powerful tools capable of representing very complex constructions in an elegant framework.

However, the grammar-based systems have weaknesses. In particular, they may be unwieldy and difficult to modify and maintain, and unexpected rule interactions may produce incorrect output. Furthermore, customization of a grammar-based system is a complex process which requires significant expertise and may therefore be both time- and cost-intensive.

SUMMARY OF THE INVENTION

The present invention includes a system and method for converting speech recognition engine output into formatted text according to a set of customizable rules and operations. The method includes both customizable and fixed components that transform text input according to language-specific, domain-specific, and site-specific requirements.

In a first aspect, the present invention is a method for converting output from a speech recognition engine, including the steps of collecting an output from the speech recognition engine, converting the output to a list of tokens, identifying a first set of tokens matching a first set of predetermined patterns, performing a first set of rewrite rules, where the first set of rewrite rules is performed to transform text that matches a first set of predetermined patterns, identifying and transforming a first set of number clusters in which each number cluster is adjacent to a keyword, identifying and transforming a second set of number clusters that may or may not be adjacent to keywords, performing a second set of rewrite rules, and performing a third set of rewrite rules.

In some embodiments the method also includes the step of performing at least a second rule interpretation where a rule interpretation is performed to transform text that matches a second set of predetermined patterns. In some embodiments the method may include the step of converting punctuation tokens into symbols that cling to adjacent words, which may be capitalized. The method may also include the step of removing text used according to a set of post-processor rules. In some embodiments the method may also include the step of writing a file containing post-processed output to a target location, where the target location is a buffer or a file.

In a second aspect, the present invention includes a method of post processing raw data from a speech recognition engine or other source. The method includes converting the raw data into a list of tokens. The method also includes applying an initial set of rewrite rules. The rewrite rules may include converting number clusters adjacent to keywords and independent number clusters according to operations defined for the rewrite rules. The method further includes applying one or more sets of rewrite rules in a cascading fashion. The method may also include formatting of the raw data for punctuation and the removal of markers and tags not intended for visibility in the final document. Finally, the method includes storing the processed and formatted speech recognition output on a memory medium.

The above features are of representative embodiments only, and are presented only to assist in understanding the invention. It should be understood that they are not to be considered limitations on the invention as defined by the claims, or limitations on equivalents to the claims. Additional features and advantages of the invention will become apparent from the drawings, the following description, and the claims.

BRIEF DESCRIPTION OF THE DRAWINGS

While the specification concludes with claims particularly pointing out and distinctly claiming the present invention, it may be believed the same will be better understood from the following description taken in conjunction with the accompanying drawings, which illustrate, in a non-limiting fashion, the best mode presently contemplated for carrying out the present invention, and in which like reference numerals designate like parts throughout the figures, wherein:

DETAILED DESCRIPTION OF THE EMBODIMENTS

Figure 1:
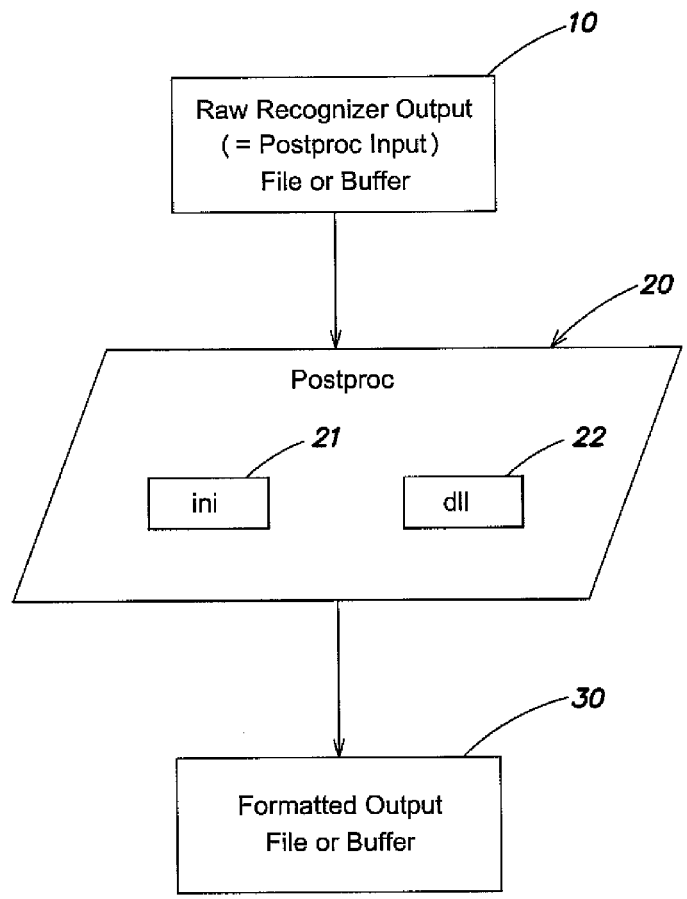
FIG. 1 illustrates a diagram representing the architecture of the present system and method according to one embodiment of the invention.

For simplicity and illustrative purposes, the principles of the present invention are described by referring mainly to the exemplary embodiment thereof. However, one of ordinary skill in the art would readily recognize that the same principles are equally applicable to, and can be implemented in, many types of post processing systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present invention relate to the conversion of dictation into usable and formatted documents by providing a method of post processing speech recognition output. In particular, the post processing system may be configured to implement rewrite rules and process raw speech recognition output or other raw data according to the rewrite rules. The post processing system may be configured to initially perform a conversion step. The conversion step may be configured to convert the raw output or raw data into tokens as a means of preparing the raw data for pattern recognition and processing.

The system may be configured to include a set of fixed components and a set of customizable components to transform raw data into formatted text according to language specific, domain specific, user specific, and/or site-specific rules or requirements. This may be accomplished by configuring the system to match keywords or tokens in context and implement rewrite rules. The rewrite rules may be written in a very general or a precise and strict manner. The rule writing capabilities may tightly constrain the pattern matching and thereby provide a much more efficient and robust system customized for a particular site.

As an example of fixed rules, rewrite rules may identify and correct cases where speech recognition output mistakenly generates the punctuation token corresponding to ":" (colon) rather than the anatomical term "colon". The postprocessor may check the context of this word for the presence of common site-independent words, such as "patient's", which indicate that the anatomical token was meant. The system may be configured to identify and correct such common errors as a set of fixed interpretation rules. While the punctuation formatting may be one embodiment of the fixed rewrite rules, one of ordinary skill in the art would understand that post processing might be employed using other fixed rules and different subject matter.

As an example of customized rules, rewrite rules may identify specific section headings of a document or report and format the section headings according to standard practices of a particular site. Standard identified headings may receive formatting such as adding empty lines above and below the headings, underlining the headings, and capitalizing the headings. One of ordinary skill in the art would understand that other customized formatting is possible and falls within the scope of the present invention.

The system may also be configured to employ a first set of rewrite rules and then employ additional sets of rewrite rules in a cascading fashion. Multiple levels or passes of rewrite rules may allow the system to perform more advanced and complicated forms of pattern recognition and processing. This multi-level system provides the power and control obtained from ordered rules while minimizing unwanted rule interactions and system complexity.

The system may be further configured to find and convert number clusters into normalized or formatted text. The system may also be configured to perform pattern recognition of number clusters with or without adjacent keywords. For example, the string of text "10 30 p.m." may be recognized as a number cluster "10 30" adjacent to the keyword "p.m.", and the string may be normalized to "10:30 p.m.".

Number clusters alone may also be subject to specific rewrite rules. For example, the speech recognition output string "9 27 03" may be formatted to "9/27/2003" according to specific rewrite rules. One of ordinary skill in the art would understand that dates and numbers can be expressed in numerous ways and that the rewrite rules listed above are of a representative nature. One of ordinary skill in the art would also understand that rewrite rules might include other date or number representations and still fall within the scope and meaning of the invention.

Another example of number cluster formatting may include formatting raw data into appropriate medical report formats. As an example, the dictation of blood pressure by a doctor or assistant may be in many forms. Customized rewrite rules may be included for recognizing number clusters with and without adjacent keywords and formatting the blood pressure references properly. The speech recognition output strings "blood pressure 120 over 70" or even "blood pressure 120 70" may be equivalent and understandable verbal descriptions of the blood pressure of 120 over 70. However, as an example, a rewrite rule may be written to format these strings into the required medical reporting standard of "blood pressure 120/70". Such rules may save time and effort by normalizing medical reports and reducing the amount of transcriptionist review and editing of speech recognition output for medical reports.

The system may be configured to recover and remain flexible even if the system fails on one particular rewrite rule or number cluster. The existence of the individual rewrite rules and the independent nature of the rules may provide the system with the flexibility to identify only the patterns and text it is capable of editing and formatting. The system may therefore be configured to avoid problematic text and leave that text for human transcriptionist processing.

FIG. 1 illustrates an exemplary architecture of a post processing system in accordance with an embodiment. It should be readily apparent to those of ordinary skill in the art that the exemplary architecture depicted in FIG. 1 represents a generalized schematic illustration and that other components may be added or existing components may be removed or modified.

As shown in FIG. 1, the post processing system includes a speech recognition output 10 or raw data 10. This speech recognition output 10 may be unformatted and may come directly from a speech recognition engine, another post processor, or another tool producing unformatted raw text or data. The system of FIG. 1 also included the post processor 20 which processes the speech recognition output 10 and produces the formatted output 30. The post processor 20 may employ two files: the initialization file 21 and the dynamic link library file 22. Like the speech recognition output, the formatted output may be stored in a file on some memory device or may be stored in buffer memory. The formatted output 30 may be in final form or may need to be passed to another post processor or a human transcriptionist for further processing.

The post processor 20 may be implemented as a software program, a utility, a subroutine, or other similar programming entity. In this respect, the post processor 20 may be implemented using software languages such as C, C++, Java, etc. Alternatively, the post processor 20 may be implemented as an electronic device utilizing an application-specific integrated circuit, discrete components, solid-state components or a combination thereof.

Figure 2:
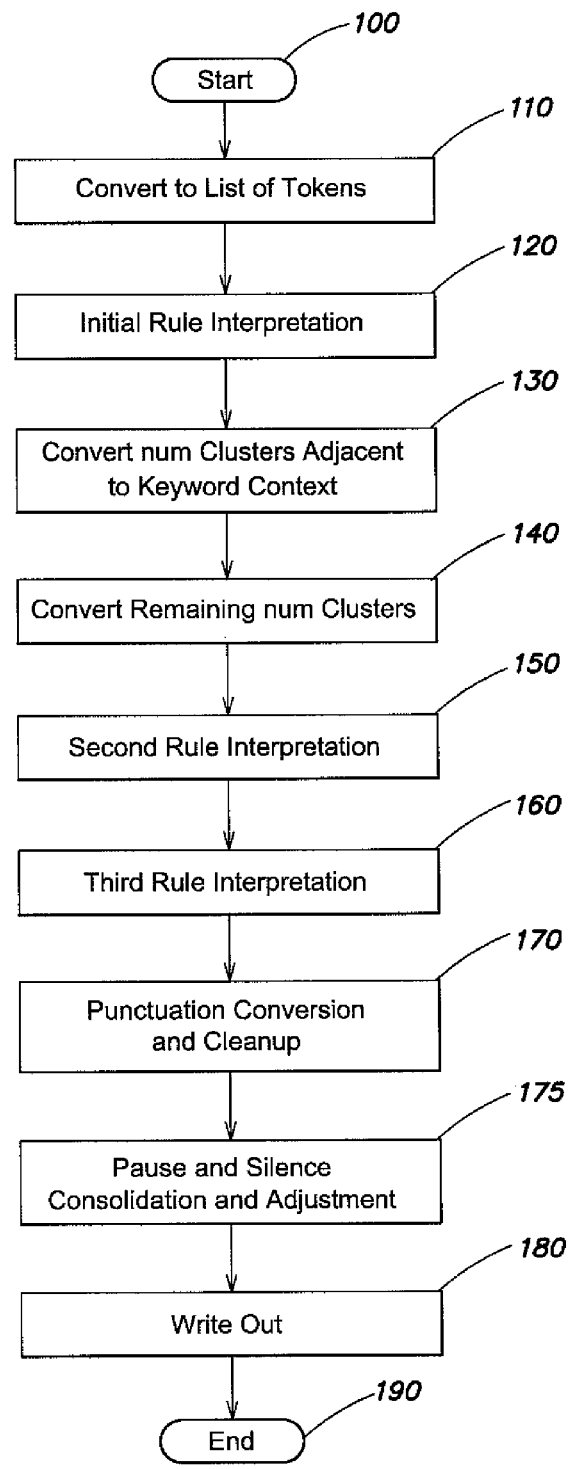
FIG. 2 illustrates a flow diagram of the present system and method according to one embodiment of the invention.

FIG. 2 illustrates an exemplary flow diagram of the post processor 20 in accordance with an embodiment. It should be readily apparent to those of ordinary skill in the art that this method represents a generalized illustration and that other steps may be added or existing steps may be removed or modified.

As shown in FIG. 2, the post processor 20 may start at location 100 where the speech recognition output 10 is received by the post processor 20. The initial step 110 may be converting the unformatted text of the speech recognition output 10 into a list of tokens maintained internally with additional information for more efficient processing in later steps. The additional information may be in the form of tags.

The second step 120 may be to apply an initial rewrite rule. The rule may be considered as two columns. The left column may represent a list of patterns to be matched with literal tokens, with identifiers associated with sets of tokens or token sequences, or with wildcards. It should be readily apparent to one of ordinary skill in the art that many matching techniques using tokens or other methods may be used. The right column may represent each of the rewrite rules and list the transformed output. The output could be a correctly spelled word or a number or other output consistent with the operation of a rewrite rule. For instance, one rewrite rule may join two adjacent color words with a hyphen, such as the conversion of "blue green" to "blue-green".

The third step 130 may be to convert number clusters adjacent to keywords according to specific rewrite rules. For instance, in an embodiment applied to medical transcription or post processing of medical reports, the keywords would be medical keywords located next to number clusters. An example of a number cluster adjacent to a key word would be the words "blood pressure" adjacent to a numerical representation of blood pressure. Rewrite rules, implemented like step 120 and the initial rewrite rules, may match the pattern of a number cluster adjacent to a keyword and transform the number cluster and key word according to the operation of a rewrite rule.

The fourth step 140 may convert the remaining number clusters according to rewrite rules. For example, the number cluster "100 5" from a speech recognition output without any adjacent keywords may be transformed into the appropriate number "105".

The fifth step 150 may employ a second set of rewrite rules. The second set of rewrite rules takes advantage of the completed rules performed above. For example, more advanced rules in the second set may now act on tokens, strings of tokens, etc. and may take advantage of the fact that "one hundred five" has been transformed into "105".

The sixth step 160 may employ a third set of rewrite rules and take advantage of the previous rules above. The system may thus be configured to apply cascading (sets of) rewrite rules which when applied in sequence can constructively apply very complex and sophisticated rules for matching and transforming the speech recognition output 10.

The seventh step 170 may apply rewrite rules of punctuation and may remove tags and other markers in the speech recognition output 10 that should not be visible in the formatted output 30. For instance, the word "period" may be transformed into a period and appended to the previous word.

Step 175 may consolidate or suppress filled pauses and silences and adjust the boundaries between them and adjacent words.

Finally, step 180 may write the file into a storage medium. The file may be stored on a hard drive or other permanent storage device or the file could be stored in a buffer. Upon storing the formatted output 30, the ending location 190 of the post processor 20 indicates where the formatted output 30 may be in sufficient form for a final medical report or may require additional processing by a human transcriptionist or different post processor.

While FIG. 2 illustrates the steps of a possible embodiment of the post processor 20, the order and configuration of the steps may be reorganized, deleted, modified or added to and still fall within the scope of the present invention. It should be readily apparent to those of ordinary skill in the art that adding sets of rewrite rules and/or reordering the sequence of applying rewrite rules may increase the complexity and sophistication of the combined rewrite rules as well as provide specific cascading rewrite rules necessary for the specific formatting requirements of a particular site.

Figure 3:
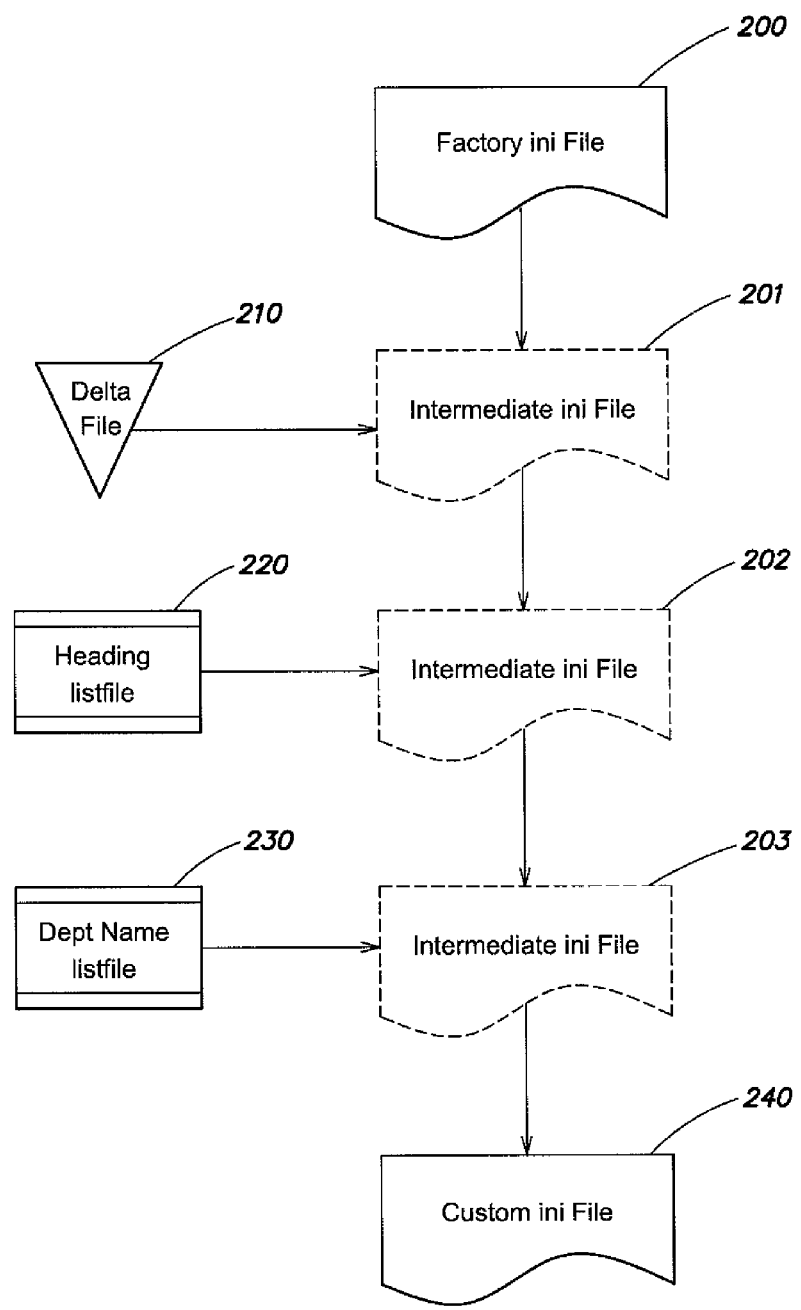
FIG. 3 illustrates a flow diagram showing the initialization file generation according to one aspect of the invention.

FIG. 3 illustrates an exemplary flow diagram of the customized initialization file generation in accordance with an embodiment. It should be readily apparent to those of ordinary skill in the art that this method represents a generalized illustration and that other steps may be added or existing steps may be removed or modified.

As shown in FIG. 3, the customization of a factory initialization file 200 may incorporate the addition of site-specific files to create a customized initialization file 240. The factory initialization file 200 may contain a certain set of tokens or strings of tokens with rewrite rules included. The intermediate initialization file 201 may be created if a delta file 210 is present. The delta file 210 may include a set of on-off switches that will correspond to entries in the factory initialization file 200. The delta file 210 may therefore override the default settings of the factory initialization file 200 and modify which factory supplied rewrite rules may be used by the post processor 20.

The intermediate initialization file 202 may be created if a heading list file 220 is present. The heading list file 220 may consist of a plain text file with one phrase and a character return per line. The heading list file 220 provides the factory initialization file with a list of phrases that may be associated with the identifier "heading". Phrases identified in the speech recognition output 10 may be treated according to a rewrite rule specifically controlling the formatting and transformation of headings.

The intermediate initialization file 203 may be created if a department name list file 230 is present. The department name list file 230 is similar to the heading list file 220. The department name list file 230 may contain phrases associated with department names to be identified in the speech recognition output 10 according to a specific rewrite rule controlling the formatting and transformation of department names.

It should be readily apparent to those of skill in the art that the heading list file 220 and the department name list file 230 may be included or omitted in the generation of the customized initialization file 240. It should also be apparent that additional or modified list files might be included in the generation of the customized initialization file 240 according to the requirements of a specific site.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer-readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, may be a computer-readable medium. The same may be true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

For the convenience of the reader, the above description has focused on a representative sample of possible embodiments, a sample that teaches the principles of the invention and conveys the best mode contemplated for carrying it out. The description has not attempted to exhaustively enumerate all possible variations. Further undescribed alternative embodiments are possible. It will be appreciated that many of those undescribed embodiments are within the literal scope of the following claims, and others are equivalent.

What is claimed is:

1. A computer implemented method for altering output from a speech recognition engine, the method comprising:
   inputting the output from a speech recognition engine into a post processor configured to convert the output, comprising speech-recognized dictation in the form of unformatted raw text or data, from the speech recognition engine to a formatted text document that is a transcription of the dictation, the post processor operatively configured to:
   convert said output to a list of tokens;
   identify a set of tokens from said list of tokens matching a first set of predetermined patterns; and
   perform a set of rewrite rules based on said identified set of tokens, the rewrite rules used to transform the output of the speech recognition engine to the formatted text document that corresponds to the dictation, wherein the set of rewrite rules comprise:
   identify section headings in the speech-recognized dictation;
   format the section headings according to a standard practice of a specific site;
   identify and transform number clusters adjacent to keywords in the speech-recognized dictation;
   identify and transform number clusters not adjacent to keywords in the speech-recognized dictation;
   perform consolidation or suppression of filled pauses and silences in the speech-recognized dictation;
   perform attachment and format punctuation in the speech-recognized dictation; and
   perform capitalization of words following punctuation in the speech-recognized dictation to thereby provide the formatted text document for writing to a storage device.

2. The method according to claim 1, wherein a second set of rewrite rules may operate on the result of the first set of rewrite rules as well as the transformed number clusters.

3. The method according to claim 2, further comprising performing at least a second rule interpretation performed to transform text that matches a second set of predetermined patterns.

4. The method according to claim 3, further comprising converting punctuation tokens into symbols that cling to an adjacent word.

5. The method according to claim 4, where the adjacent word is capitalized.

6. The method according to claim 5, where filled pauses and silences are consolidated or suppressed and the boundaries between them and adjacent words are adjusted.

7. The method according to claim 6, further comprising removing text used according to a set of post processor rules.

8. The method according to claim 7, further comprising writing a file containing post-processed output to a target location.

9. The method according to claim 8, where the target location is a buffer.

10. The method according to claim 9, where the target location is a file.

11. A computer implemented method for converting output from a speech recognition engine, the method comprising:
  inputting the output of the speech recognition engine to a post processor configured to convert the output, comprising speech-recognized dictation in the form of unformatted raw text or data, from the speech recognition engine to a formatted text document that is a transcription of the dictation;
  converting, by the post processor, the output to a list of tokens;
  identifying, by the post processor, a set of tokens from the list of tokens matching a first set of predetermined patterns; and
  performing, by the post processor, a set of rewrite rules based on the identified set of tokens, the rewrite rules used to transform the output of the speech recognition engine to the formatted text document that corresponds to the dictation, wherein performing the set of rewrite rules comprises identifying and transforming number clusters adjacent to keywords in the speech-recognized dictation, identifying and transforming number clusters not adjacent to keywords in the speech-recognized dictation, performing consolidation or suppression of filled pauses and silences in the speech-recognized dictation, and performing attachment and formatting punctuation in the speech-recognized dictation to thereby provide the formatted text document for writing to a storage device.

* * * * *